US008051422B2

(12) United States Patent
Narita et al.

(10) Patent No.: US 8,051,422 B2
(45) Date of Patent: Nov. 1, 2011

(54) RESOURCE ASSIGNMENT METHOD FOR QUERY PARTIONING BASED ON PROCESSING COST OF EACH PARTITION

(75) Inventors: Masaaki Narita, Yokohama (JP); Shota Kumagai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1076 days.

(21) Appl. No.: 11/847,651

(22) Filed: Aug. 30, 2007

(65) Prior Publication Data

US 2008/0109813 A1    May 8, 2008

(30) Foreign Application Priority Data

Nov. 8, 2006    (JP) .................................. 2006-303057

(51) Int. Cl.
*G06F 9/46* (2006.01)
(52) U.S. Cl. ........ 718/104; 707/600; 707/607; 707/608; 709/201; 709/204; 709/205
(58) Field of Classification Search .................. 707/600, 707/607, 608; 709/201, 204, 205; 718/104
See application file for complete search history.

(56) References Cited

U.S. PATENT DOCUMENTS

| 6,009,265 | A  | * | 12/1999 | Huang et al.  | 1/1 |
| 6,507,834 | B1 | * | 1/2003  | Kabra et al.  | 707/718 |
| 7,383,247 | B2 | * | 6/2008  | Li et al.     | 1/1 |
| 7,574,424 | B2 | * | 8/2009  | Chowdhuri     | 1/1 |
| 2002/0087611 | A1 | * | 7/2002 | Tanaka et al. | 709/1 |
| 2004/0215639 | A1 | * | 10/2004 | Bamford et al. | 707/100 |
| 2005/0081210 | A1 | * | 4/2005 | Day et al. | 718/104 |

OTHER PUBLICATIONS

Abdelkader Hameurlain, Franck Morvan; An Overview of Parallel Query Optimization in relation Systems; 2000, IEEE, pp. 629-634.*
Peng Liu, Yasushi Kiyoki, Takashi Masuda; Efficient Algorithms for Resource Allocation in Distributed and Parallel Query Processing Environment; 1989; IEEE, pp. 316-323.*
Joel L. Wolf et al, "A Hierarchiacal Approach to Parallel Multiquery Scheduling", IEEE Transactions on Parallel and Distributed System, 6(6): 578-590, Jun. 1995.

* cited by examiner

*Primary Examiner* — Meng An
*Assistant Examiner* — Abu Ghaffari
(74) *Attorney, Agent, or Firm* — Brundidge & Stanger, P.C.

(57) ABSTRACT

In order to improve the unbalance of loads imposed on individual database servers at the time of executing individual SQL processing phases, a management computer partitions an inputted query request into the processing phases which are units executable in parallel, calculates resource costs needed for executing the processing phases, assigns the processing phases to the logical computers on the basis of an access right to databases, calculates resource assignment ratios of the individual logical computers in correspondence with the resource costs for the processing phases assigned to the individual logical computers, and assigns assignable resources of a physical computer to the individual logical computers, the assignable resources being equivalent to resource assignment amounts corresponding to the resource assignment ratios.

8 Claims, 10 Drawing Sheets

| SERVER NAME | CPU ASSIGNMENT RATIO | MEMORY ASSIGNMENT RATIO | CPU COST | MEMORY COST |
|---|---|---|---|---|
| DB SERVER「1」 | 45% | 25% | 1000 | 500 |
| DB SERVER「2」 | 23% | 35% | 500 | 700 |
| DB SERVER「3」 | 18% | 30% | 400 | 600 |
| DB SERVER「4」 | 14% | 10% | 300 | 200 |
| TOTAL | 100% | 100% | 2200 | 2000 |

710 SERVER-RESOURCE MANAGEMENT TABLE 711, 712, 713, 714, 715

41 TERMINAL DEVICE
41b MEMORY
41c PROGRAM
41d CPU
41e HDD
41f NIF

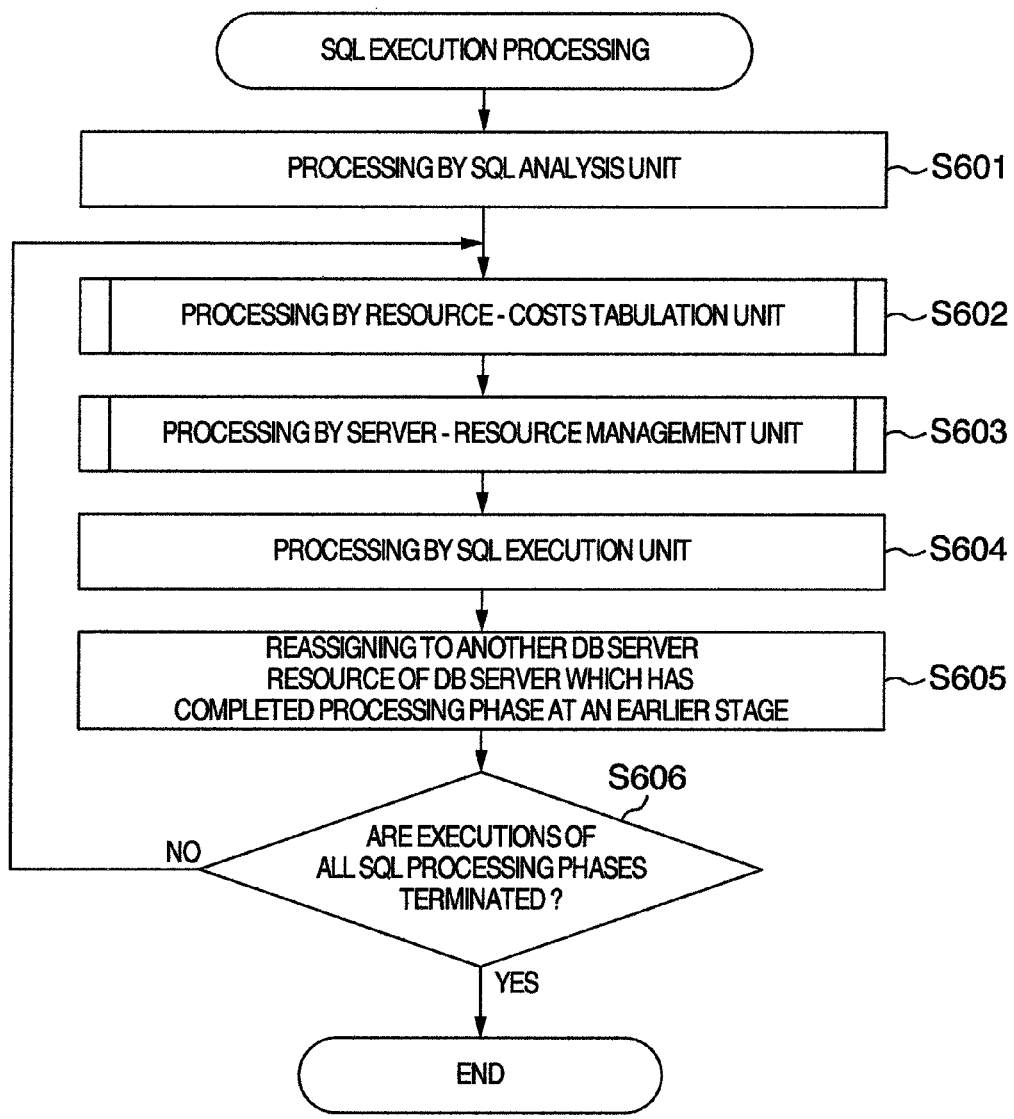

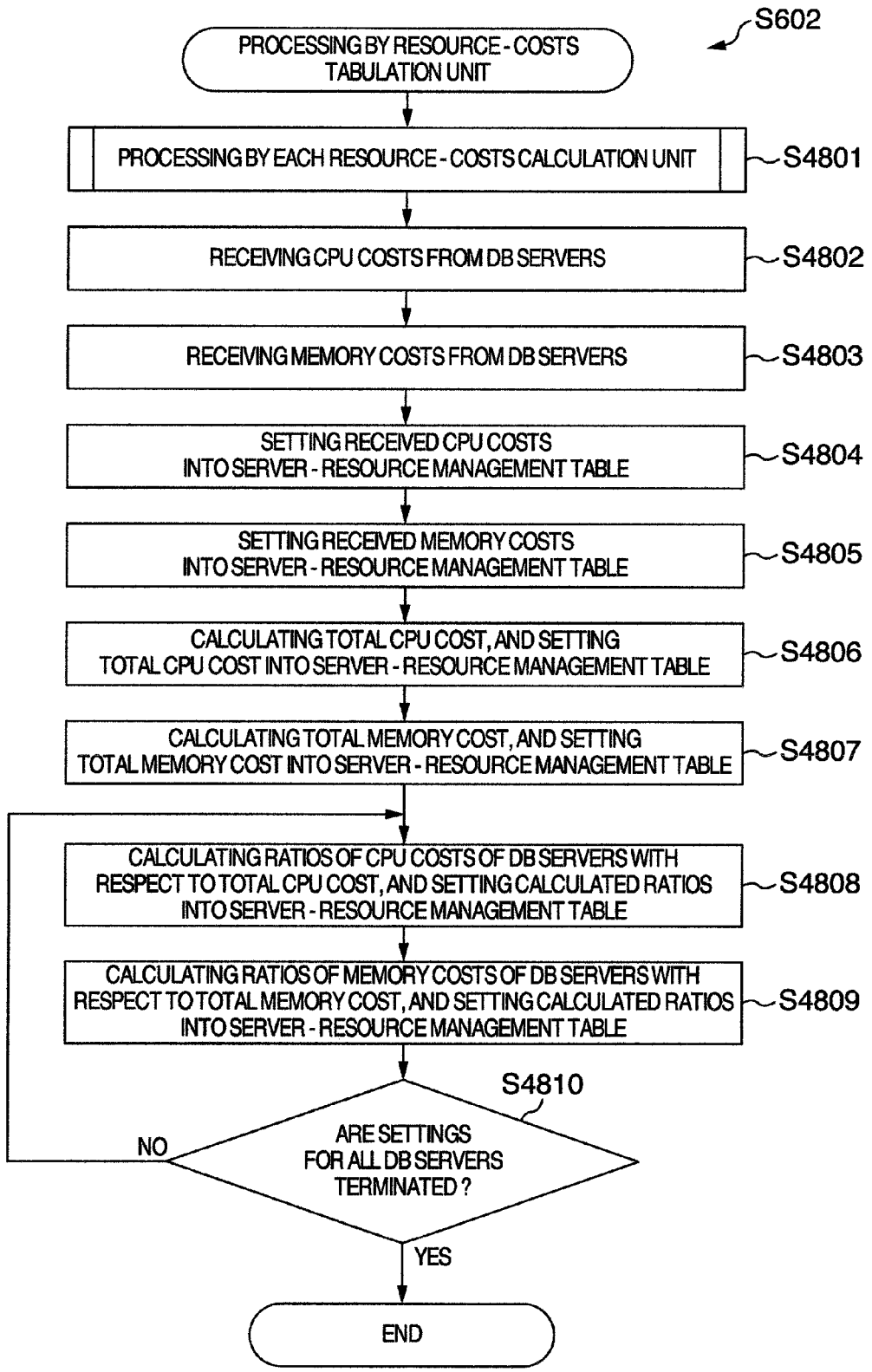

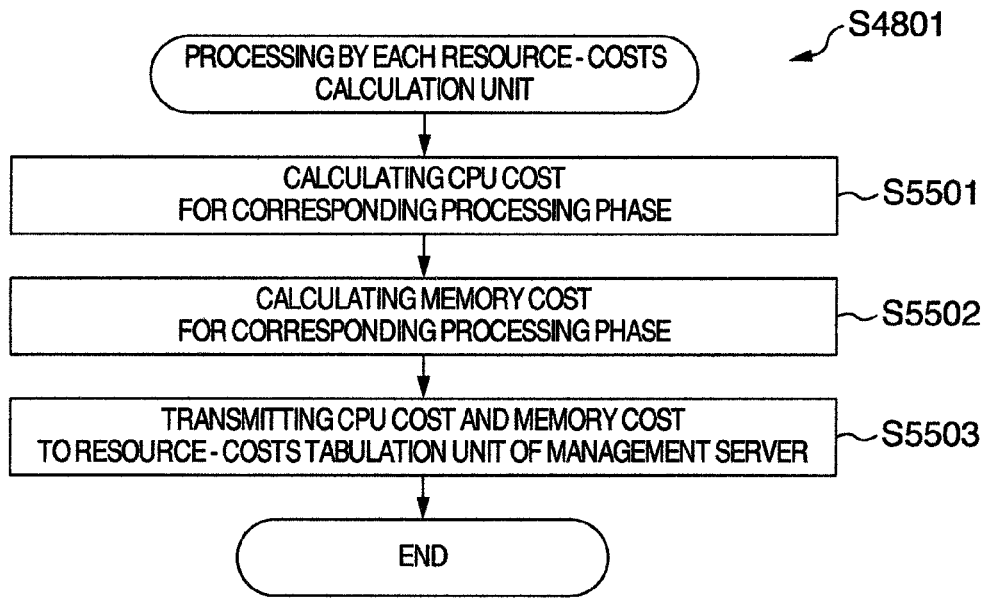
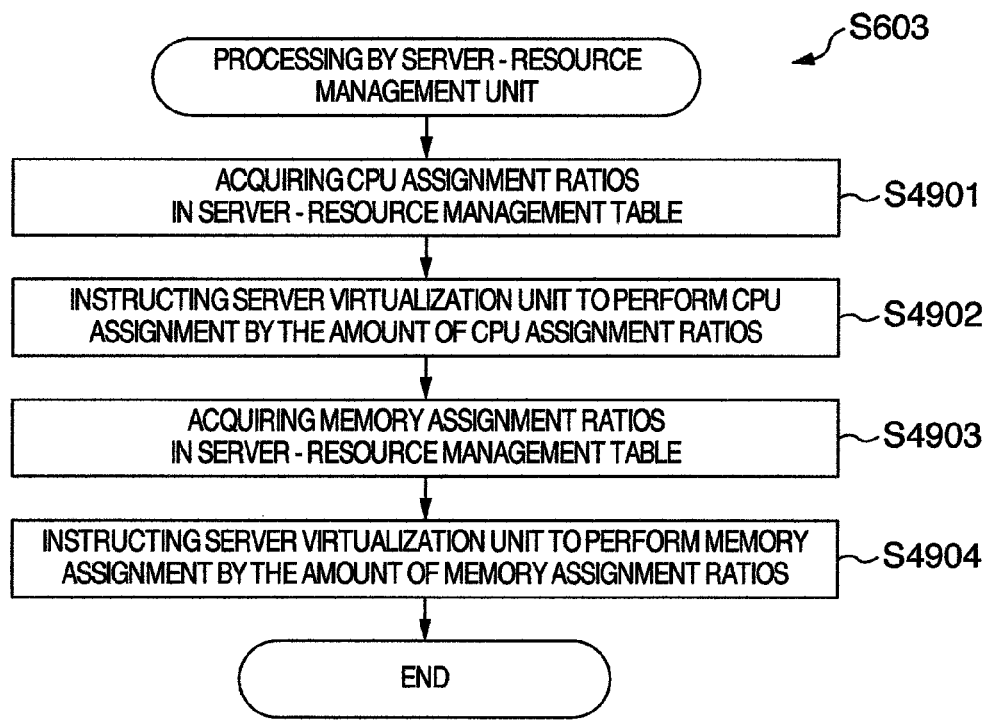

FIG. 10C

| # | SQL PROCESSING PHASES | DB SERVER [1] | | DB SERVER [2] | | DB SERVER [3] | | DB SERVER [4] | |
|---|---|---|---|---|---|---|---|---|---|
| | | COST | ASSIGNMENT RATIO | COST | ASSIGNMENT RATIO | COST | ASSIGNMENT RATIO | COST | ASSIGNMENT RATIO |
| 1 | (1) | 40 | 29% | 30 | 21% | 40 | 29% | 30 | 21% |
| 2 | (2) | 20 | 33% | 0 | 0% | 40 | 67% | 0 | 0% |
| 3 | (3) | 100 | 40% | 0 | 0% | 150 | 60% | 0 | 0% |
| 4 | (3)-(A) | 100 | 100% | 0 | 0% | 0 | 0% | 0 | 0% |
| 5 | (4) | 0 | 0% | 200 | 100% | 0 | 0% | 0 | 0% |

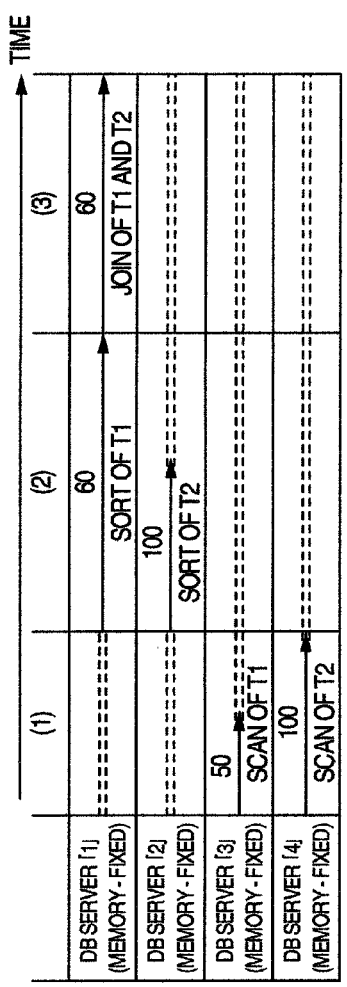
FIG.11A
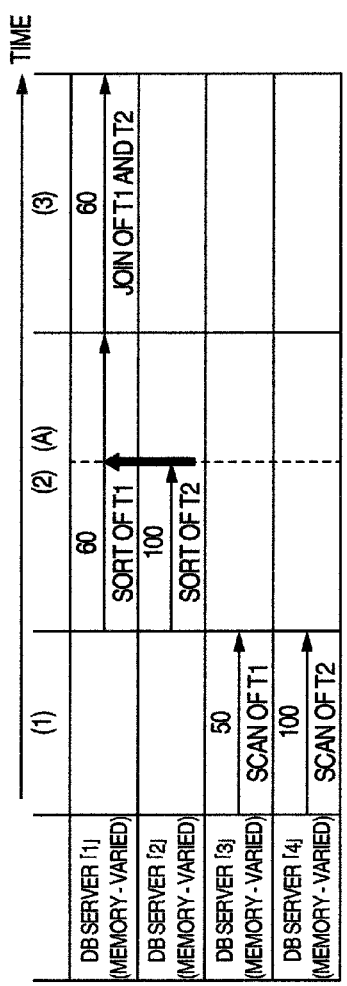
FIG.11B
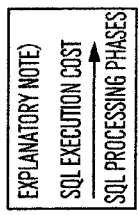
FIG.11D
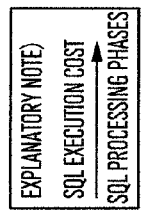
FIG.11E
FIG.11C
| # | SQL PROCESSING PHASES | DB SERVER [1] | | DB SERVER [2] | | DB SERVER [3] | | DB SERVER [4] | |
|---|---|---|---|---|---|---|---|---|---|
| | | COST | ASSIGNMENT RATIO | COST | ASSIGNMENT RATIO | COST | ASSIGNMENT RATIO | COST | ASSIGNMENT RATIO |
| 1 | (1) | 0 | 0% | 0 | 0% | 0 | 0% | 100 | 67% |
| 2 | (2) | 60 | 38% | 100 | 62% | 0 | 0% | 0 | 0% |
| 3 | (2)-(A) | 60 | 100% | 0 | 0% | 0 | 0% | 0 | 0% |
| 4 | (3) | 60 | 100% | 0 | 0% | 0 | 0% | 0 | 0% |

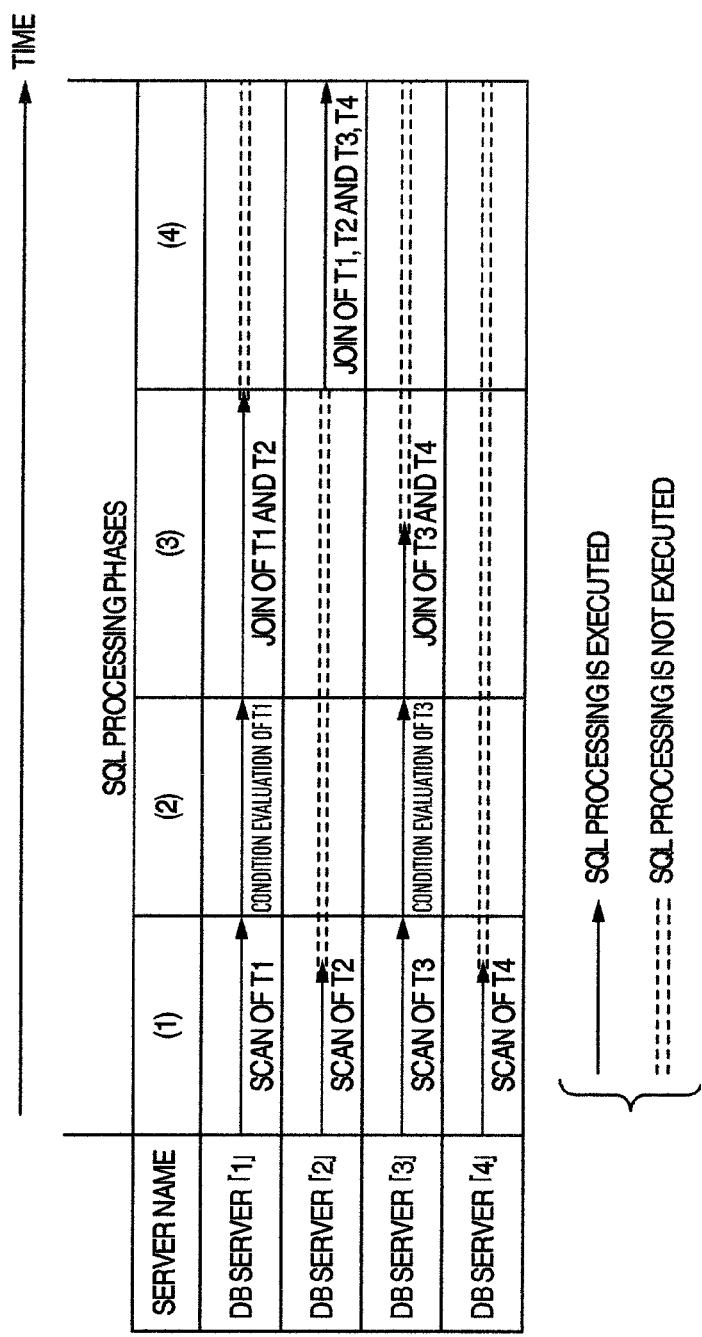

RESOURCE ASSIGNMENT METHOD FOR QUERY PARTIONING BASED ON PROCESSING COST OF EACH PARTITION

INCORPORATION BY REFERENCE

The present application claims priority from Japanese application JP2006-303057 filed on Nov. 8, 2006, the content of which is hereby incorporated by reference into this application.

BACKGROUND OF THE INVENTION

The present invention relates to technologies on a resource assignment method, a resource assignment program, and a management computer which are suitable for a relational database management system.

A DBMS (: Database Management System) is a system for answering a query made into data stored in a database. In particular, a RDBMS (: Relational Database Management System), which is a system for managing a table-format database, is the most common as the DBMS. SQL (: Structured Query Language) is frequently used as a language for describing a query made into the stored data.

Addressing a large number of queries requires that the processing time needed for processing a query be shortened. As a result, conventionally, a parallel processing such as pipeline processing has been performed in the following way: A query processing is partitioned into a plurality of phases, and the individual processing phases are distributed among a plurality of nodes (i.e., computer resources), thereby implementing the parallel processing.

Incidentally, a distribution algorithm is important which is used for determining to which node the individual processing phases should be distributed. For example, in the technology described in "A Hierarchical Approach to Parallel Multi-Query Scheduling", Joel L. Wolf, John Turek, Ming-Syan Chen and Philip S. Yu, IEEE Transactions on Parallel and Distributed Systems, 6(6): pp. 578-590, June 1995, the individual processing phases are distributed based on each type of statistical information which is stored in dictionary of the DBMS, and which is about the query that becomes the processing target.

SUMMARY OF THE INVENTION

As the scheme of a DBMS which includes a plurality of servers, there exist shared-disk scheme and shared-nothing scheme. In the shared-disk scheme, all of disks are accessible from all of servers which are going to make queries. Meanwhile, in the shared-nothing scheme, only a disk which belongs to each server independently is accessible from each server.

Accuracy of the distribution algorithm exerts a significant influence on utilization efficiency of the resource (i.e., CPU and memory) of a DB server which is going to make an access to a disk. For example, if the processing distribution turns out to be unsuccessful and the processing phases are concentrated onto a specific DB server, the other DB servers fall into a processing-awaiting state. Namely, unbalance of the resources occurs, thus preventing implementation of effective utilization of the DB servers. In particular, in the shared-nothing scheme, the unbalance of the resources occurs in large amounts. This is because the DB servers which have fallen into the processing-awaiting state occupy the disks of their own access targets.

FIG. 12A and FIG. 12B are explanatory diagrams for explaining an execution example of SQL processing phases. An example of the SQL query processing illustrated in FIG. 12A is partitioned into processing phases. Moreover, as illustrated in FIG. 12B, the processing phases are distributed among individual DB servers, then being executed.

The SQL example illustrated in FIG. 12A is partitioned into the following six processing phases: Incidentally, order of these processing phases indicates order of their execution.

scans of T1 to T4: from ⌈T1, T2, T3, T4⌋
condition evaluation of T1: from ⌈T1. C1='DB'⌋
condition evaluation of T3: from ⌈T3. C1< >'AP'⌋
join of T1 and T2: from ⌈T1. C1=T2. C1⌋
join of T3 and T4: from ⌈T3. C1=T4. C1⌋
join of T1, T2 and T3, T4: from ⌈T1, T2, T3, T4⌋

The DB server ⌈1⌋, the DB server ⌈2⌋, the DB server ⌈3⌋, and the DB server ⌈4⌋ are DB servers of different housings, respectively. A mutually same amount of resource (i.e., CPU and memory) is assigned to each DB server. This assignment amount will not be modified even if time elapses.

When the SQL processing phase (1) is executed, capability of the CPU of each DB server is equal, and type of the processing phase of "scan" in each DB server is identical. Variations, however, exist among data amounts of the individual data of T1, T2, T3, and T4, i.e., target data in the SQL processing phase. Accordingly, variations also arise among points-in-time at which the individual DB servers will have terminated the individual scans.

As a result, in each of the DB server ⌈2⌋ and the DB server ⌈4⌋ which have terminated processing at an earlier stage, there must arise an idle time (represented by a dashed line in the drawing) during which the SQL processing is not executed. This idle time is implemented in order to synchronize the DB server ⌈2⌋ and the DB server ⌈4⌋ with processing times (represented by solid-line arrows in the drawing) of the DB server ⌈1⌋ and the DB server ⌈3⌋ which still continue processing. Consequently, utilization efficiency of the resource of each of the DB server ⌈2⌋ and the DB server ⌈4⌋ becomes worse because of this idle time.

When the SQL processing phase (2) is executed, similarly, the CPUs of the DB server ⌈2⌋ and the DB server ⌈4⌋ are not used which do not execute the SQL processing phase (2). Accordingly, ratio of the time during which the SQL processing is executed with respect to summation of the operation times of the individual DB servers is equal to 50%, which is a bad utilization efficiency.

When the SQL processing phase (3) is executed, ⌈join of T1 and T2⌋ and ⌈join of T3 and T4⌋ are executed by the initially assigned CPUs alone. Also, the CPUs of the DB server ⌈2⌋ and the DB server ⌈4⌋ are not used which do not execute the SQL processing phase (3). Accordingly, usage efficiency of the CPUs is equal to 50%. Moreover, after ⌈join of T3 and T4⌋ has been completed, the CPU of the DB server ⌈3⌋ is not used either. Consequently, the usage efficiency of the CPUs becomes equal to 25%, which is a bad utilization efficiency.

When the SQL processing phase (4) is executed, ⌈join of T1, T2 and T3, T4⌋ is executed by the DB server ⌈2⌋ alone. Also, the CPUs of the other DB servers (i.e., the DB server ⌈1⌋, the DB server ⌈3⌋, and the DB server ⌈4⌋) are not used. Consequently, the usage efficiency of the CPUs is equal to 25%, which is a bad utilization efficiency.

Accordingly, a main object of the present invention is to solve the above-described problem, and to improve the unbalance of loads imposed on the individual database servers (i.e., logical computers) at the time of executing the individual SQL processing phases.

In order to solve the above-described problem, in the present invention, there is provided a resource assignment method by a management computer for assigning resources of a physical computer, the resources being used by a plurality of logical computers when executing a query request into databases stored in a storage, the plurality of logical computers being configured by being executed as programs on the physical computer, the resource assignment method, including the steps of partitioning the inputted query request into a plurality of processing phases which are units executable in parallel, calculating resource costs by making reference to a memory unit for storing cost master information, the resource costs being needed for executing the processing phases of the inputted query request, the cost master information indicating processing contents of the logical computers and resource costs needed for executing the processing contents for each phase type of the processing phases, receiving the resource costs for the processing phases from the individual logical computers, and storing the resource costs into the memory unit on the basis of access rights of the logical computers to the databases, the processing phases being assigned to the individual logical computers, calculating resource assignment ratios of the individual logical computers by making reference to the resource costs stored into the memory unit, and by dividing the resource costs for the processing phases assigned to the individual logical computers by summation of the resource costs for the processing phases assigned to all of the individual logical computers, and modifying assignment amounts of the resources of the physical computer in correspondence with the calculated resource assignment ratios, the resources being assigned to the individual logical computers. The other units will be described later.

According to the present invention, by modifying the resource assignment ratios in the SQL processing phase unit, it becomes possible to improve the unbalance of loads imposed on the individual database servers (i.e., logical computers) at the time of executing the individual SQL processing phases.

Other objects, features and advantages of the invention will become apparent from the following description of the embodiments of the invention taken in conjunction with the accompanying drawings.

BRIEF DESCRIPTION OF THE DRAWINGS

FIG. 6 is a flowchart for illustrating processing steps of the SQL execution processing according to an embodiment of the present invention;

FIG. 7 is a flowchart for illustrating processing steps of resource-costs tabulation according to an embodiment of the present invention;

FIG. 8 is a flowchart for illustrating processing steps of resource-costs calculation according to an embodiment of the present invention;

FIG. 9 is a flowchart for illustrating processing steps of the server-resource management according to an embodiment of the present invention;

FIG. 10A to FIG. 10E are explanatory diagrams for explaining an example of CPU assignment according to an embodiment of the present invention;

FIG. 11A to FIG. 11E are explanatory diagrams for explaining an example of memory assignment according to an embodiment of the present invention; and FIG. 12A and FIG. 12B are the explanatory diagrams for explaining the execution example of the SQL processing phases.

DETAILED DESCRIPTION OF THE INVENTION

Figure 1:
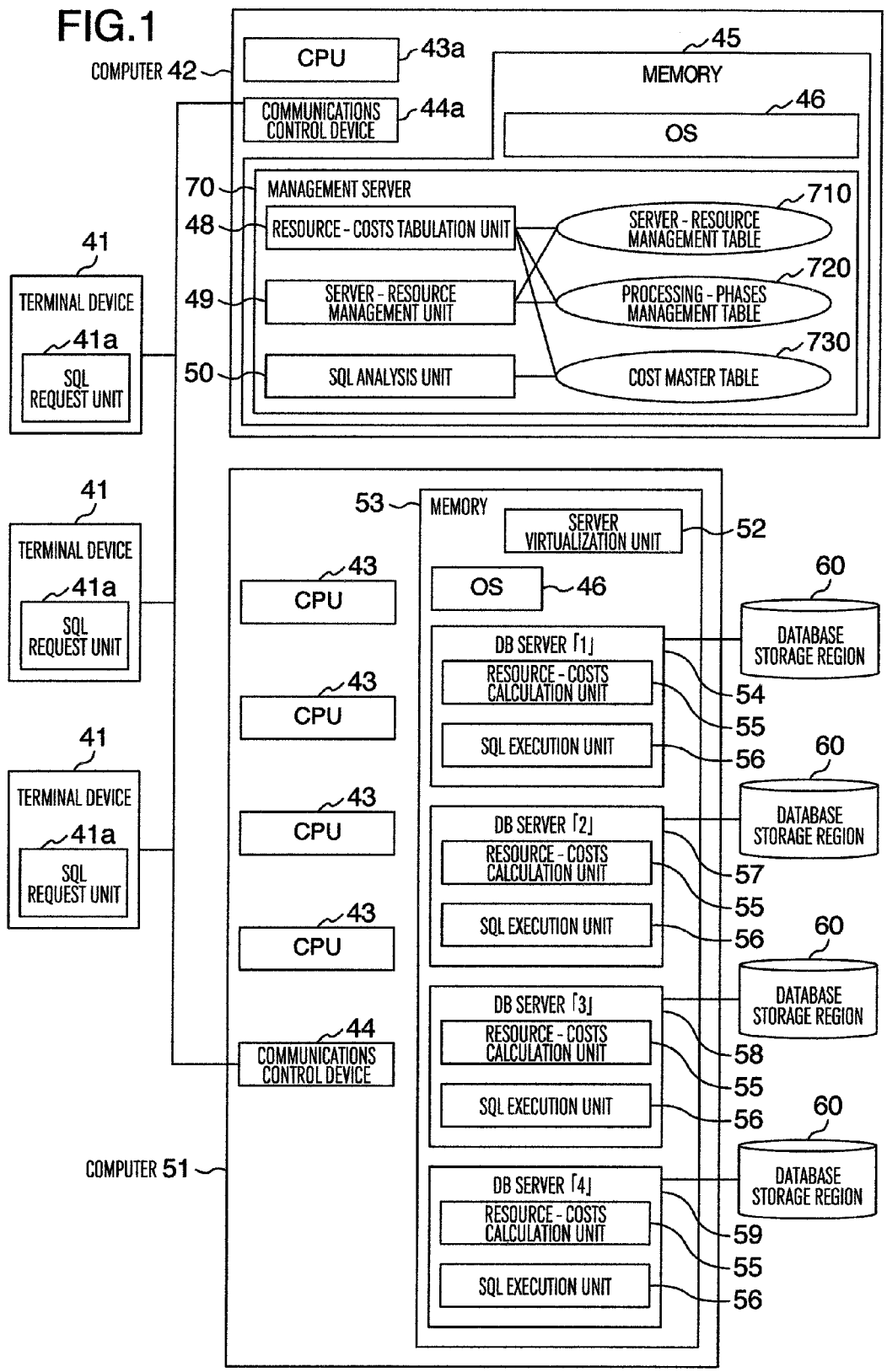
FIG. 1 is a configuration diagram for illustrating the entire DBMS according to an embodiment of the present invention.

Hereinafter, referring to the drawings, the explanation will be given below concerning a DBMS which is an embodiment of the present invention.

FIG. 1 is a configuration diagram for illustrating the entire DBMS. The DBMS inputs therein a SQL request (SQL query request), which is instruction information for using databases. The DBMS includes terminal devices 41 for displaying contents of the databases, a computer 42 for accepting SQL requests from SQL request units 41a of the terminal devices 41, and a computer 51 for controlling database storage regions 60 in accordance with an instruction from the computer 42. The database storage regions 60 are configured by a magnetic storage device or the like.

The computer 42 (which is a management computer) includes a CPU 43a, a communications control device 44a, and a memory 45. An OS 46 is installed on the memory 45. A management server 70, which operates on the OS 46, is installed on the memory 45, and operates using the CPU 43a. The management server 70 includes a resource-costs tabulation unit 48, a server-resource management unit 49 (computer-resource management unit), and a SQL analysis unit 50. The communications control device 44a allows the terminal devices 41 to transmit the SQL requests to the management server 70 via a network.

In addition to the resource-costs tabulation unit 48, the server-resource management unit 49, and the SQL analysis unit 50, the management server 70 includes a server-resource management table 710, a processing-phases management table 720, and a cost master table 730 (i.e., memory unit for storing cost master information). Incidentally, any one of individual DB servers of the computer 51 is allowed to play a role of the management server 70 in substitution therefor.

The computer 51 (which is a physical computer) includes CPUs 43, a communications control device 44, and a memory 53. The OS 46 is installed on the memory 53. The individual DB servers (DB server [1] 54, DB server [2] 57, DB server [3] 58, and DB server [4] 59) are not physical housings, but are virtual servers (i.e., logical computers). A server virtualization unit 52 of the computer 51 assigns the CPU 43 and the memory 53, i.e., resources, to the individual DB servers. This allows the individual DB servers to operate using the resources assigned thereto by the server virtualization unit 52. Incidentally, the memory 45 and the memory 53 are implemented with a memory such as, e.g., flash memory or silicon memory.

Incidentally, the virtual servers are implemented by LPAR (Logical Partition) technology. By partitioning a single physical computer, this technology makes the single physical computer seem as if it were a plurality of logical computers. Namely, the single physical computer executes programs, thereby configuring the plurality of logical computers. In order to execute a processing, the logical computers take advantage of the resources (i.e., CPUs and memory) of the physical computer. Incidentally, as software for implementing LPAR, e.g., VMware Server by VMware Corp. can be mentioned.

Also, the individual DB servers are directly connected to the individual database storage regions 60. This is the shared-nothing scheme, where only a DB server which has the direct-connection relationship with a database storage region 60 of the connection destination has an access right to the database storage region 60. Meanwhile, the shared-disk scheme is also employable, where all the DB servers have access rights to the database storage regions 60. Each individual DB server includes each individual resource-costs calculation unit 55 and each individual SQL execution unit 56.

Figure 2:
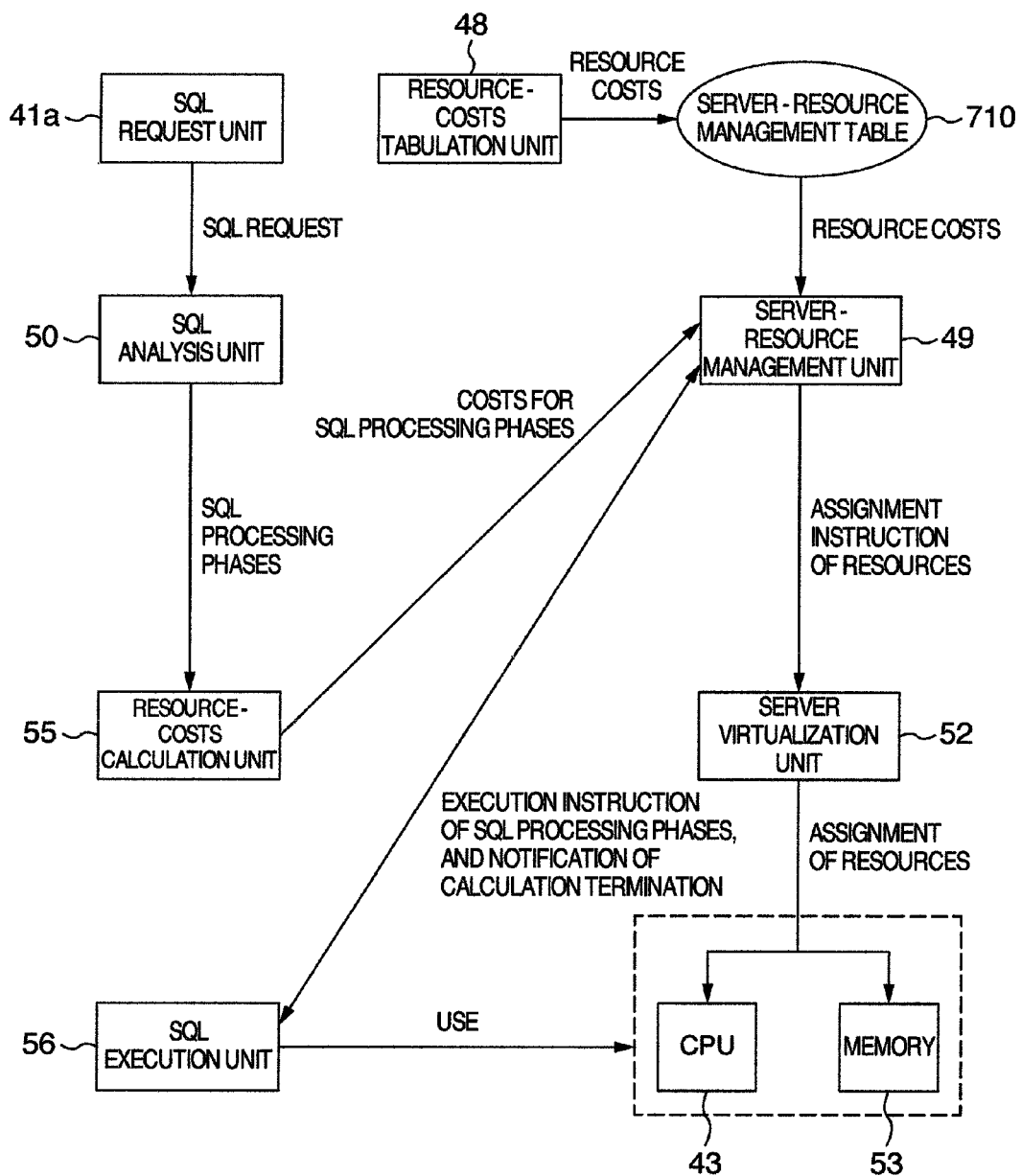
FIG. 2 is a configuration diagram for illustrating configuration components associated with a SQL query processing of the entire DBMS according to an embodiment of the present invention.

FIG. 2 is a configuration diagram for illustrating configuration components associated with the SQL processing of the DBMS. Hereinafter, referring to FIG. 1 as required, the explanation will be given below concerning this configuration diagram.

The resource-costs tabulation unit 48 tabulates individual CPU costs and individual memory costs transmitted from the individual DB servers. Moreover, the resource-costs tabulation unit 48 sets, into the server-resource management table 710, the total CPU cost and the total memory cost of the entire system, the individual CPU costs and the individual memory costs of the individual DB servers, and individual ratios of the individual CPU costs with respect to the total CPU cost and individual ratios of the individual memory costs with respect to the total memory cost.

The server-resource management unit 49 makes reference to the server-resource management table 710 on the memory 45. Then, based on the individual ratios of the CPU costs of the individual DB servers with respect to the total CPU cost and the individual ratios of the memory costs of the individual DB servers with respect to the total memory cost, the server-resource management unit 49 instructs the server virtualization unit 52 to assign the CPU 43 and the memory 53 to the individual DB servers. In accordance with the instruction, the server virtualization unit 52 assigns the CPU 43 and the memory 53 on each DB-server basis.

Each individual request unit 41a prompts the user to input a SQL request. The SQL request unit 41a notifies the SQL analysis unit 50 of the inputted SQL request.

The SQL analysis unit 50 makes a syntactic analysis of the SQL request issued from the SQL request unit 41a. The syntactic analysis is, e.g., a lexical analysis in SQL. Moreover, the SQL analysis unit 50 partitions the SQL request into a plurality of SQL processing phases in order to process the SQL request in parallel in a plurality of nodes. Hereinafter, based on an example given by the following Expression 1, the detailed explanation will be given below regarding the processing in the SQL analysis unit 50. Here, Expression 1 indicates an example of the SQL request before being partitioned into the SQL processing phases.

SELECT T2.C1 FROM T2 ORDER BY T2.C2    (Expression 1)

The SQL analysis unit 50 partitions the SQL request in Expression 1 into two processing phases. The first processing phase is a data extraction phase (i.e., phase of extracting data existing in the database storage regions 60), which corresponds to [SELECT T2. C1 FROM T2]. The second processing phase is a data merge phase (i.e., phase of performing a sort processing with respect to column T2. C2), which corresponds to [ORDER BY T2. C2].

Incidentally, the processing phases obtained from the partition are not limited to the data extraction phase and the data merge phase. Namely, the SQL analysis unit 50 may address various types of processing phases. For example, "A Hierarchical Approach to Parallel Multi-Query Scheduling", Joel L. Wolf, John Turek, Ming-Syan Chen and Philip S. Yu, IEEE Transactions on Parallel and Distributed Systems, 6(6): pp. 578-590, June 1995 describes an example where various SQL requests are partitioned into processing phases. Also, the SQL analysis unit 50 may partition the SQL request into the processing phases by using the publicly-known technology which makes it possible to process a SQL request at a high speed (Refer to documents such as "A Hierarchical Approach to Parallel Multi-Query Scheduling", Joel L. Wolf, John Turek, Ming-Syan Chen and Philip S. Yu, IEEE Transactions on Parallel and Distributed Systems, 6(6): pp. 578-590, June 1995).

Of the processing phases obtained from the partition by the SQL analysis unit 50, each individual resource-costs calculation unit 55 calculates cost for a processing phase to be executed in its own DB server, then transmitting the calculated cost to the management server 70. For example, each individual resource-costs calculation unit 55 analyzes that the data extraction phase is a processing phase in which the memory cost of the memory 53 used for accessing the database storage regions 60 is high. Also, each individual resource-costs calculation unit 55 analyzes that the data merge phase is a processing phase in which the CPU cost of a CPU 43 used for executing the sort processing is high.

Of the processing phases obtained from the partition by the SQL analysis unit 50, each individual resource-costs calculation unit 55 calculates the cost for the processing phase to be executed in its own DB server, then transmitting the calculated cost to the management server 70.

The server-resource management unit 49 distributes, to the individual DB servers, the individual processing phases obtained from the partition by the SQL analysis unit 50. Incidentally, the distribution of the processing phases is implemented by outputting the program code for executing the SQL request to the individual DB servers of the distribution destinations.

Each individual SQL execution unit 56 extracts the data from each individual database storage region 60, using the CPU 43 and the memory 53 which the server virtualization unit 52 has assigned in accordance with the instruction from the server-resource management unit 49. Furthermore, the SQL execution unit 56 performs calculations specified by the individual processing phases distributed thereto, then notifying the server-resource management unit 49 of the calculation termination.

Figure 3:
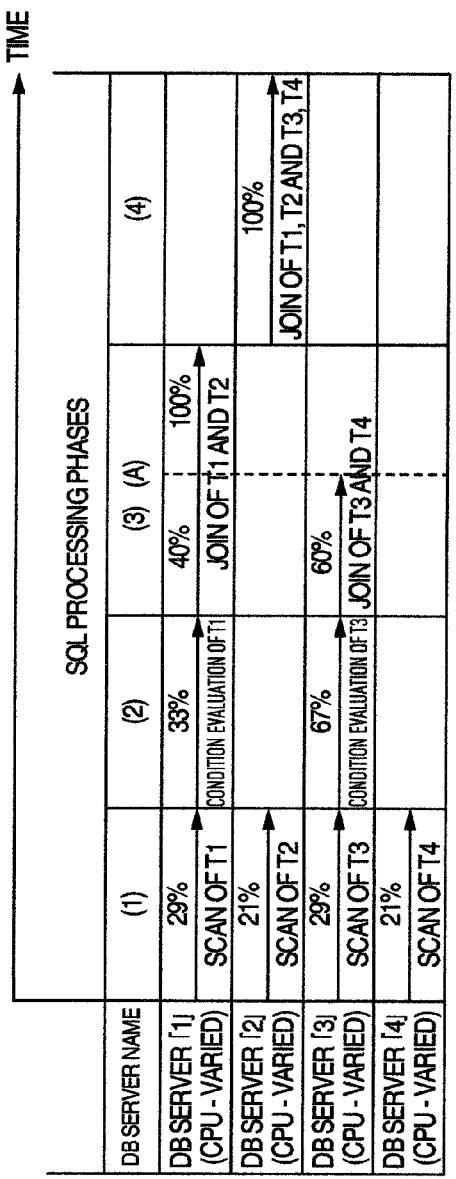
FIG. 3A to FIG. 3C are configuration diagrams for illustrating a processing-phases management table according to an embodiment of the present invention.

FIG. 3A to FIG. 3C are configuration diagrams for illustrating the processing-phases management table 720.

FIG. 3A is the diagram where the individual SQL processing phases to be executed in the individual DB servers are illustrated in a manner of being accompanied by individual CPU assignment ratios which are assigned to the individual SQL processing phases. FIG. 3B indicates data in the processing-phases management table 720 corresponding to FIG. 3A. The individual CPU assignment ratios are determined in accordance with ratios of the CPU costs corresponding to the individual processing phases. Incidentally, the individual resource assignment ratios are calculated by fractions whose denominators are assignable resource amounts and whose numerators are resource amounts which will be assigned. Namely, the resource amounts which will actually be assigned are determined by multiplications of the resource assignment ratios and the assignable resource amounts.

When the SQL processing phase (1) is executed, in order to execute [scan of T1], [scan of T2], [scan of T3], and [scan of T4], the CPUs are assigned to the DB server [1], the DB server [2], the DB server [3], and the DB server [4] by 29%, 21%, 29%, and 21% respectively in accordance with the assignment ratios of the CPU costs illustrated in FIG. 3B.

When the SQL processing phase (2) is executed, the CPUs are assigned to only the DB server [1] which performs [condition evaluation of T1] and the DB server [3] which performs [condition evaluation of T3]. As is the case with the SQL processing phase (1), the CPUs are assigned to the DB server [1] by 33% and the DB server [3] by 67% respectively in accordance with the assignment ratios of the CPU costs illustrated in FIG. 3B.

When the SQL processing phase (3) is executed, the CPUs are assigned to only the DB server [1] which performs [join of T1 and T2] and the DB server [3] which performs [join of T3 and T4]. As is the case with the SQL processing phase (1), the CPUs are assigned to the DB server [1] by 40% and the DB server [3] by 60% respectively in accordance with the assignment ratios of the CPU costs illustrated in FIG. 3B.

When the SQL processing phase (4) is executed, the CPUs are assigned to only the DB server [2] which performs [join of T1, T2 and T3, T4]. As is the case with the SQL processing phase (1), the CPUs are assigned to the DB server [2] by 100% in accordance with the assignment ratios of the CPU costs illustrated in FIG. 3B.

Based on the assignments of the CPUs in accordance with the CPU assignment ratios explained so far, the individual DB servers find it possible to substantially simultaneously terminate processing of the individual processing phases distributes thereto. Accordingly, the CPU usage efficiency of each DB server becomes equal to 100%, which is an excellent utilization efficiency.

Incidentally, the resource of a DB server which has completed a distributed processing phase at an earlier stage may be reassigned to another DB server. For example, if, in the SQL processing phase (3), the data to be processed in [join of T1 and T2] is larger in amount than the data to be processed in [join of T3 and T4], in some cases, the processing of [join of T3 and T4] is completed at an earlier stage. In this case, the assignment ratios of the CPU costs are recalculated after the processing of [join of T3 and T4] has been completed. Next, the assignments of the CPUs to the individual DB servers are performed based on the recalculated assignment ratios.

As a result, the assignment ratio of the DB server [1] which is still in execution of [join of T1 and T2] is modified into 100%. Here, this value of 100% is the summation of 60%, i.e., the assignment ratio of the DB server [3] which has completed [join of T3 and T4] at an earlier stage, and 40%, i.e., the assignment ratio already assigned to the DB server [1]. As a consequence, the CPU usage efficiency always becomes equal to 100%, which is an excellent utilization efficiency.

Figures 4, 5:
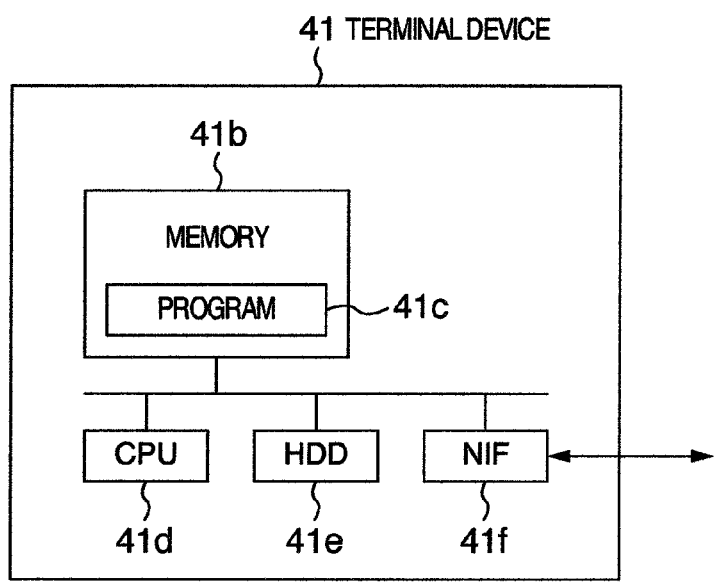
FIG. 4 is a configuration diagram for illustrating a server-resource management table according to an embodiment of the present invention.
FIG. 5 is a configuration diagram for illustrating a terminal device according to an embodiment of the present invention.

FIG. 4 is a configuration diagram for illustrating the server-resource management table 710.

The server-resource management table 710 stores CPU assignment ratio 712, memory assignment ratio 713, CPU cost 714, and memory cost 715 of an individual DB server corresponding to server name 711 in such a manner that all these factors are caused to correspond to each other using the server name 711 as the key. Furthermore, the server-resource management table 710 holds information on totals of the CPU assignment ratios 712, the memory assignment ratios 713, the CPU costs 714, and the memory costs 715 of all the individual DB servers.

The CPU assignment ratio 712 indicates the ratio of actually assigned CPUs with respect to the assignable CPUs of the entire system. The memory assignment ratio 713 indicates the ratio of actually assigned memory capacity with respect to the assignable memory capacity of the entire system. The CPU cost 714 indicates the CPU cost needed for a processing phase to be executed. The memory cost 715 indicates the memory cost needed for the processing phase to be executed. For example, in the DB server [1], the CPU assignment ratio is [45%], the memory assignment ratio is [25%], the CPU cost is [1000], and the memory cost is [500].

FIG. 5 is a configuration diagram for illustrating the terminal device 41.

The terminal device 41 is a computer including a CPU (: Central Processing Unit) 41d, a memory 41b, a HDD (: Hard Disk Drive) 41e, and a NIF (: Network Interface). The CPU 41d executes a program 41c read into the memory 41b.

The following Table 1 indicates an example of the cost master table 730. The cost master table 730 is caused to correspond to phase type, processing contents, the CPU cost, and the memory cost on each processing-phase basis. For example, the phase type [join] is implemented by [one-time sort, one-time merge] as the processing contents of the computer. Implementing the processing contents requires the resources of the CPU cost [100] and the memory cost [50].

TABLE 1 cost master table

| phase type | processing contents | resource cost | |
| --- | --- | --- | --- |
| | | CPU cost | memory cost |
| join | one-time sort one-time merge | 100 | 50 |
| . | . | . | . |
| . | . | . | . |
| . | . | . | . |

FIG. 6 is a flowchart for illustrating processing steps of the SQL execution processing.

Processing (S601) by the SQL analysis unit 50 will be explained below: Having received a SQL processing request from the terminal device 41, the SQL analysis unit 50 makes the syntactic analysis of a SQL statement inputted as the processing request. In this way, the SQL analysis unit 50 partitions the SQL statement into a plurality of processing phases in order to process the query processing in parallel in a plurality of DB servers.

Processing (S602) by the resource-costs tabulation unit 48 will be explained below: Making reference to the cost master table 730, the resource-costs tabulation unit 48 tabulates the CPU costs and the memory costs for the above-described processing phases, thereby acquiring the ratios of the resources for each DB server with respect to the entire system.

Processing (S603) by the server-resource management unit 49 will be explained below: Based on the ratios of the resources for each DB server with respect to the entire system, the server-resource management unit 49 instructs the server virtualization unit 52 to assign the resources to each DB server.

Processing (S604) by the SQL execution unit 56 will be explained below: The SQL execution unit 56 executes the above-described processing phases, using the resources assigned on each DB-server basis.

Incidentally, the server-resource management unit 49 may reassign, to another DB server, the resource of a DB server which has completed a distributed processing phase at an earlier stage (S605). Additionally, the resource reassignment processing had been already explained in the SQL processing phase (3) in FIG. 3A.

Moreover, a judgment is made as to whether or not the executions of all the SQL processing phases have been terminated (S606). If all the SQL processing phases have been not terminated (S606, No), the processing subsequent to S602 are applied to a processing phase not terminated. Meanwhile, if all the SQL processing phases have been terminated (S606, Yes), the SQL execution processing is terminated.

FIG. 7 is a flowchart for illustrating processing steps of the resource-costs tabulation.

The resource-costs tabulation unit 48 in the management server 70 sets, into the server-resource management table 710, the information about the CPU costs and the memory costs of the individual DB servers.

Processing (S4801) by each individual resource-costs calculation unit 55 will be explained below: Having acquired the information on the SQL processing phases, at S4801, each individual resource-costs calculation unit 55 calculates the CPU cost and the memory cost for a processing phase to be executed in its own DB server.

At S4802, the resource-costs tabulation unit 48 receives, from the individual DB servers, the CPU costs to be executed in the individual DB servers. At S4803, the resource-costs tabulation unit 48 receives, from the individual DB servers, the memory costs to be executed in the individual DB servers.

At S4804, the resource-costs tabulation unit 48 sets the received CPU costs of the individual DB servers into the server-resource management table 710. At S4805, the resource-costs tabulation unit 48 sets the received memory costs of the individual DB servers into the server-resource management table 710.

At S4806, the resource-costs tabulation unit 48 calculates total (i.e., total CPU cost) of the received CPU costs, then setting the calculated total CPU cost into the server-resource management table 710. At S4807, the resource-costs tabulation unit 48 calculates total (i.e., total memory cost) of the received memory costs, then setting the calculated total memory cost into the server-resource management table 710.

At S4808, the resource-costs tabulation unit 48 calculates ratios of the CPU costs of the individual DB servers with respect to the total CPU cost, then setting the calculated ratios into the server-resource management table 710. At S4809, the resource-costs tabulation unit 48 calculates ratios of the memory costs of the individual DB servers with respect to the total memory cost, then setting the calculated ratios into the server-resource management table 710.

At S4810, a judgment is made as to whether or not the settings by the amount of all the DB servers have been terminated in association with the settings at the S4808 and the S4809. If the settings by the amount of all the DB servers have been terminated (S4810, Yes), the processing by the resource-costs tabulation unit 48 is terminated. Meanwhile, if the settings by the amount of all the DB servers have been not terminated (S4810, No), processing at the S4808 and the S4809 are applied to a DB server for which the settings have been not terminated.

FIG. 8 is a flowchart for illustrating processing steps of the resource-costs calculation.

At S5501, each individual resource-costs calculation unit 55 calculates the CPU cost for a corresponding processing phase to be executed in its own DB server to which the resource-costs calculation unit 55 belongs. At S5502, the resource-costs calculation unit 55 calculates the memory cost for the corresponding processing phase to be executed in its own DB server to which the resource-costs calculation unit 55 belongs.

At S5503, each individual resource-costs calculation unit 55 transmits, to the resource-costs tabulation unit 48, the information on the CPU cost acquired at S5501 and the memory cost acquired at S5502, thereby terminating the processing.

FIG. 9 is a flowchart for illustrating processing steps of the server-resource management.

At S4901, the server-resource management unit 49 makes reference to the server-resource management table 710 in FIG. 4, thereby acquiring the CPU assignment ratios 712 of all the individual DB servers. At S4902, the server-resource management unit 49 issues, to the server virtualization unit 52, the CPU assignment instruction based on the CPU assignment ratios 712 of all the individual DB servers acquired at the S4901.

At S4903, the server-resource management unit 49 makes reference to the server-resource management table 710 in FIG. 4, thereby acquiring the memory assignment ratios 713 of all the individual DB servers. At S4904, the server-resource management unit 49 issues, to the server virtualization unit 52, the memory assignment instruction based on the memory assignment ratios 713 of all the individual DB servers acquired at S4903, thereby terminating the processing by the server-resource management unit 49.

Figure 10A:
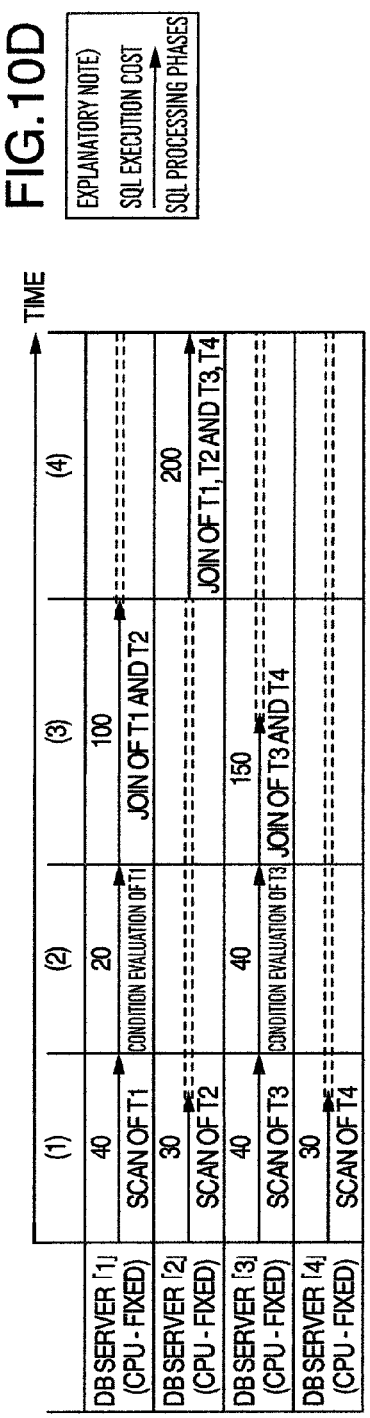
Figure 10B:
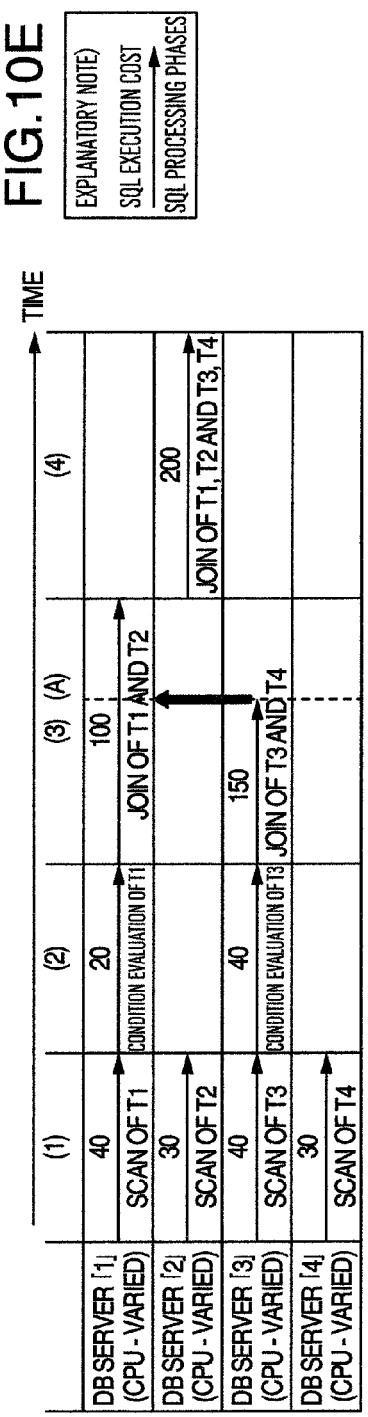

FIG. 10A to FIG. 10E are explanatory diagrams for explaining an example of the CPU assignment. The explanation will be given below regarding the case of processing the SQL request illustrated in FIG. 12A. FIG. 10A illustrates the (CPU-fixed) assignment situation where the CPUs are fixedly assigned to the individual DB servers. FIG. 10B illustrates the (CPU-varied) assignment situation where the CPUs are variedly assigned to the individual DB servers by executing the flowchart illustrated in FIG. 6.

FIG. 10C illustrates the processing-phases management table 720 corresponding to FIG. 10B. In FIG. 10B, the CPU utilization efficiency of each DB server is improved as compared with the one in FIG. 10A. Incidentally, at a point-in-time (A) in a SQL processing phase (3) in FIG. 10B, the resource reassignment is carried out (Refer to S605 in FIG. 6).

FIG. 11A to FIG. 11E are explanatory diagrams for explaining an example of the memory assignment. The explanation will be given below regarding a case of processing a SQL request given by the following Expression 2. It is assumed that the join method in Expression 2 is the merge join. Incidentally, processing phases [scans of T1 and T2] and processing phases [sorts of T1 and T2] are extracted in order to execute [from T1, T2] in Expression 2. A processing phase [join of T1 and T2] is extracted in order to execute [where T1.C1=T2.C1] in Expression 2.

select T1.C1 from T1,T2 where T1.C1=T2.C1　　(Expression 2)

FIG. 11A illustrates the (memory-fixed) assignment situation where the memory is fixedly assigned to the individual DB servers. FIG. 11B illustrates the (memory-varied) assignment situation where the memory is variedly assigned to the individual DB servers by executing the flowchart illustrated in FIG. 6. FIG. 11C illustrates the processing-phases management table 720 corresponding to FIG. 11B. In FIG. 11B, the memory utilization efficiency of each DB server is improved as compared with the one in FIG. 11A. Incidentally, at a point-in-time (A) in a SQL processing phase (2) in FIG. 11B, the resource reassignment is carried out (Refer to S605 in FIG. 6).

According to the present embodiment explained so far, by modifying the resource assignment ratios in the SQL processing phase unit, it becomes possible to improve the unbalance of loads imposed on the individual database servers at the time of executing the individual SQL processing phases. This allows an enhancement in the utilization efficiency of each resource, thereby completing the processing phases at an earlier stage. Accordingly, the number of processable processing phases increases, thereby permitting an enhancement in throughput of the processing phases.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A resource assignment method by a management computer for assigning resources of a physical computer, said resources being used by a plurality of logical computers configured from the physical computer when executing a query request into databases stored in a storage, said plurality of logical computers being configured to function as plural computers when said physical computer executes programs, said resource assignment method, comprising the steps of:
partitioning said inputted query request into a plurality of processing phases which are units executable in parallel,
calculating resource costs by making reference to memory means for storing cost master information, said resource costs being needed for executing said processing phases of said inputted query request, said cost master information indicating processing contents of said logical computers and resource costs both needed for executing said processing phase of each phase type of said processing phases, receiving said resource costs for said processing phases from said individual logical computers, and storing said resource costs into said memory means on the basis of an access right of said logical computers to said databases, said processing phases being assigned to said individual logical computers, calculating resource assignment ratios of said individual logical computers by making reference to said resource costs stored into said memory means, and by dividing said resource costs for said processing phases assigned to said individual logical computers by summation of said resource costs for said processing phases assigned to all of said individual logical computers, and modifying assignment amounts of said resources of said physical computer in correspondence with said calculated resource assignment ratios, said resources being assigned to said individual logical computers.

2. The resource assignment method according to claim 1, further comprising a step of:

said management computer modifying assignment amounts of CPUs of said physical computer in correspondence with said calculated resource assignment ratios, said CPUs being assigned to said individual logical computers.

3. The resource assignment method according to claim 1, further comprising a step of:

said management computer modifying assignment amounts of a memory of said physical computer in correspondence with said calculated resource assignment ratios, said memory being assigned to said individual logical computers.

4. The resource assignment method according to claim 1, further comprising a step of:

said management computer assigning said processing phases to said individual logical computers in accordance with an access right to said databases in shared-nothing scheme, said shared-nothing scheme permitting one of said logical computers to access one of said databases in an exclusive manner.

5. The resource assignment method according to claim 1, further comprising a step of:

said management computer assigning said processing phases to said individual logical computers in accordance with an access right to said databases in shared-disk scheme, said shared-disk scheme permitting one of said logical computers to access all of said databases in a shared manner.

6. The resource assignment method according to claim 1, further comprising a step of:

said management computer modifying said assignment amounts of said resources of said physical computer in correspondence with reassigned resource assignment ratio, said resources being assigned to said individual logical computers, by decreasing, down to zero, resource assignment ratio of a logical computer which has completed said assigned processing phase at an earlier stage, and reassigning said resource assignment ratio by the amount of said decrease to another logical computer.

7. A resource assignment program for allowing a computer to execute said resource assignment method according to claim 1.

8. A management computer for assigning resources of a physical computer, said resources being used by a plurality of logical computers configured from said physical computer when executing a query request into databases stored in a storage, said plurality of logical computers to function as plural computers when said physical computer executes programs, said management computer, comprising:

a query-request analysis unit for partitioning said inputted query request into a plurality of processing phases which are units executable in parallel, a resource-costs calculation unit for calculating resource costs by making reference to memory means for storing cost master information, said resource costs being needed for executing said processing phases of said inputted query request, said cost master information indicating processing contents of said logical computers and resource costs both needed for executing said processing phase of each phase type of said processing phases, a resource-costs tabulation unit for receiving said resource costs for said processing phases from said individual logical computers, and storing said resource costs into said memory means on the basis of an access right of said logical computers to said databases, said processing phases being assigned to said individual logical computers, and a computer-resource management unit for calculating resource assignment ratios of said individual logical computers by making reference to said resource costs stored into said memory means, and by dividing said resource costs for said processing phases assigned to said individual logical computers by summation of said resource costs for said processing phases assigned to all of said individual logical computers, said computer-resource management unit then modifying assignment amounts of said resources of said physical computer in correspondence with said calculated resource assignment ratios, said resources being assigned to said individual logical computers.

* * * * *